United States Patent
DeVlieg

(10) Patent No.: US 7,165,816 B2
(45) Date of Patent: Jan. 23, 2007

(54) CARBON BRAKE WEAR FOR AIRCRAFT

(75) Inventor: Garrett Howard DeVlieg, Bellvue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/165,942

(22) Filed: Jun. 24, 2005

(65) Prior Publication Data

US 2006/0244310 A1    Nov. 2, 2006

Related U.S. Application Data

(60) Division of application No. 10/617,196, filed on Jul. 9, 2003, now Pat. No. 6,938,857, which is a continuation of application No. 07/457,053, filed on Dec. 26, 1989, now Pat. No. 6,604,708.

(51) Int. Cl.
*B60T 13/00* (2006.01)

(52) U.S. Cl. ............................... 303/9.61; 303/155

(58) Field of Classification Search ............... 303/126, 303/155, 9.61, 20, 125, 189, 3
See application file for complete search history.

(56) References Cited

U.S. PATENT DOCUMENTS

| | | | |
|---|---|---|---|
| 2,794,609 A | 6/1957 | Perry | |
| 3,520,575 A | 7/1970 | Steigerwald | |
| 3,537,551 A | 11/1970 | Serra | |
| 3,776,333 A | 12/1973 | Mathauswer | |
| 3,926,479 A | 12/1975 | Bissell et al. | |
| 3,948,569 A | 4/1976 | Gentet | |
| 3,993,174 A | 11/1976 | Williams et al. | |
| 4,006,941 A | 2/1977 | DeVlieg | |
| 4,007,970 A | 2/1977 | Romero | |
| 4,008,868 A | 2/1977 | Berg | |
| 4,076,331 A * | 2/1978 | DeVlieg | 303/126 |
| 4,180,223 A | 12/1979 | Amberg | |
| 4,195,803 A | 4/1980 | Faure | |
| 4,205,735 A | 6/1980 | Murray | |
| 4,221,350 A | 9/1980 | Moser | |
| 4,402,478 A | 9/1983 | Martin | |
| 4,430,715 A | 2/1984 | Gentet | |
| 4,489,123 A | 12/1984 | Schijve | |
| 4,500,589 A | 2/1985 | Schijve | |
| 4,591,213 A | 5/1986 | Rapoport | |

(Continued)

FOREIGN PATENT DOCUMENTS

DE            555392           7/1932

(Continued)

OTHER PUBLICATIONS

Lin Hongy et al., "Optical and Mechanical Properties of Optically Transparent Poly(methyl methacrylate) Composites", Polymer Engineering and Science, Mar. 1992, vol. 32, No. 5, pp. 344-350.

(Continued)

*Primary Examiner*—Thomas J. Williams
(74) *Attorney, Agent, or Firm*—Perkins Coie LLP

(57) ABSTRACT

Methods and systems are provided for improving brake performance, including extending the life of carbon brakes on aircraft. One embodiment of the method comprises measuring the speed of the aircraft and the intensity of braking and comparing these to predetermined maximum values for each. If the values are both lower than the maximum values, one or more of the brakes are selectively disabled. In other embodiments, the methods and systems can include other features, including providing selected back forces on brake pedals.

4 Claims, 2 Drawing Sheets

U.S. PATENT DOCUMENTS

| | | | |
|---|---|---|---|
| 4,646,242 | A | 2/1987 | Valaas |
| 4,818,036 | A * | 4/1989 | Reinecke ............... 303/155 |
| 4,923,056 | A | 5/1990 | Nedelk |
| 4,935,291 | A | 6/1990 | Gunnink |
| 4,986,610 | A | 1/1991 | Beck |
| 4,992,323 | A | 2/1991 | Vogelesang |
| 5,039,566 | A | 8/1991 | Skubic |
| 5,160,771 | A | 11/1992 | Lambing |
| 5,429,326 | A | 7/1995 | Garesche |
| 5,547,735 | A | 8/1996 | Roebroeks |
| 5,615,934 | A | 4/1997 | Abuelsamid |
| 5,665,450 | A | 9/1997 | Day |
| 6,478,252 | B1 | 11/2002 | Stimson |
| 6,604,708 | B1 | 8/2003 | De Vlieg |
| 2004/0065776 | A1 | 4/2004 | DeVlieg |

FOREIGN PATENT DOCUMENTS

| | | |
|---|---|---|
| DE | 1756129 | 2/1970 |

OTHER PUBLICATIONS

Lin, H. et al., "Temperature and wavelength dependent transmission of optically transparent glass fibre poly (methyl methacrylate) composites", Journal of Material Science 29 (1994), pp. 5193-5198, Chapman Hall.

Lin, Hongy et al., "Aging Behavior of Optically Transparent Poly (Methyl Methacrylate) Composites", Polymer Compsites, Oct. 1993, vol. 11, No. 5, pp. 402-409.

Lin, Hongy et al., "Model for the temperature dependent transmission of optically transparent poly (methyl methacrylate) composites", Journal of Material Research, (Feb. 1993), vol. 8 No. 2, pp. 364-370, Materials Research Society.

Lin, Hongy et al., "The Effect of Fiber Annealing on the Properties of an Optically Transparent PMMA Composite", Composites Science and Technology 50 (1994) pp. 367-372, Elsevier Science Publishers Ltd.

Milewski, et al., "Physical Properties of Glass Ribbon", Handbood of Reinforcements for Plastics, Van Nostrand Reinhold Co. 1987, p. 80.

Olson, James R., "Fabrication and Mechanical Properties of an Optically Transparent Glass Fiber/Polymer Matrix Composite," Journal of Composite Materials, pp. 1181-1192, vol. 26, No. 8, (1992) Technome Publishing Co.

Weaver, Kevin D. et al., "Preparatin and Properties of Optically Transparent, Pressure-Cured Poly (Methyl Methacrylate) Composites", Polymer Composites, Dec. 1993, vol. 14, No. 5, pp. 515-523.

Weaver, Kevin D., Interfacial Bonding and Optical Transmission for Transparent Fiberglass/Poly (Methyl Methacrylate) Composites, Polymer Composites, Apr. 1995, vol. 16, No. 2, pp. 161-169.

* cited by examiner

CARBON BRAKE WEAR FOR AIRCRAFT

CROSS-REFERENCE TO RELATED APPLICATIONS

This application is a divisional of U.S. application Ser. No. 10/617,196, filed Jul. 9, 2003 now U.S. Pat. No. 6,938,857, which is a continuation of U.S. application Ser. No. 07/457,053, filed Dec. 26. 1989, and issued Aug. 12, 2003 as U.S. Pat. No. 6,604,708.

This invention relates to a method and means for increasing the life of carbon aircraft brakes. More particularly, this invention relates to the controlled application of braking pressure to only selected brakes during low speed ground travel.

BACKGROUND

Modern aircraft which are designed to carry large passenger or cargo payloads are often provided with carbon brakes on each of the wing or body mounted wheels. The nose wheel is typically not braked. Carbon brakes are preferred because of their light weight and performance characteristics and generally comprise a piston housing and parts, a torque plate and a carbon heat sink stack. This stack contains all the friction surfaces which, when compressed, cause the wheel to decrease its speed. The stack comprises a pressure plate, rotor disks, stator disks and backing plate. Carbon composite rotors are connected to the wheel through the rotor drive keys and turn with the wheel. Carbon composite stators, pressure plates and backing plate are connected to the torque tube and do not turn. Braking friction is caused when the rotors are compressed against the stators.

While carbon brakes are preferred for weight and performance reasons over steel brakes, the cost of replacing the stack divided by the number of landing cycles between replacements is much higher than for steel brakes.

Aircraft brake control systems are designed with separate pedal controls for the left and right brakes. When one of the brake pedals is depressed, all the brakes on that side of the aircraft are commanded to apply simultaneously and equally. By applying all brakes equally, the heat energy absorbed by each individual brake is minimized. For steel brakes, brake life is largely determined by the total amount of energy absorbed by each brake and is largely unaffected by the number of brake applications that accumulate that energy. Hence, brake control systems that apply all brakes simultaneously and equally provide economic operation of steel brakes and minimize exposure to overheating of any individual brake. However, direct application of this method to carbon brakes does not extend and may significantly shorten their lives. Accordingly, this invention provides a novel method and means to extend the life of carbon brakes and substantially reduce their operating cost.

BRIEF SUMMARY

In accordance with the invention carbon brake life is significantly extended by decreasing the number of brake applications during each landing cycle. More particularly, brake wear has been found to correlate significantly with the number of brake applications and to not be significantly affected by the energy absorbed during each. By far the largest number of brake applications occur during ordinary taxiing, so in preferred embodiments of this invention, only some of the brakes are applied in response to brake applications under ordinary taxiing conditions. An alternating wheel braking pattern is established to minimize brake wear at each braked wheel and yet to promote even distribution of absorbed energy among all the brakes. This, in turn, prevents overheating of any individual brake. The extended brake-wear system is activated only when aircraft ground speed and brake application pressures are typical of taxi operations. Preferably, aircraft speed and hydraulic pressure are sensed so that brakes at all wheels will be operative in critical braking situations such as landing, parking, or emergency stopping.

The invention will be better understood in terms of the Figures and detailed description which follow.

DETAILED DESCRIPTION

For carbon brakes, the landings to wear-out ratio is strongly dependent on the number of brake applications rather than the energy absorbed by a brake during each application. For commercial passenger aircraft, the brakes may be applied an average of twenty times per landing cycle. The brakes are generally applied during landing absorbing several million foot-pounds for heavy wide-bodied aircraft and once to stop the wheels from spinning before they are retracted after take-off. Both of these are "high speed" brake applications, and are typically at moderate hydraulic pressures less than about 1500 psi hydraulic pressure. The balance of the brake applications are "taxi snubs" for steering or low speed braking. They create hydraulic brake fluid pressures generally less than about 1500 psi and absorb about 0.5 MFP average per snub for wide-bodied aircraft. These taxi snubs account for a significant amount of brake energy temperature buildup, and for carbon brakes, most of the wear since carbon brake wear is dependent on the number of brake applications. Occasionally, "emergency" brake applications may be made at higher pressures (up to 3000 psi hydraulic fluid pressure), but such emergency braking is an insignificant wear factor.

Conventional brake wear control systems provide for applying all brakes equally, gently, and simultaneously during normal taxi braking. In accordance with a preferred embodiment of this invention, the life of carbon brakes is extended by minimizing the number of brake applications while distributing the heat energy absorbed substantially equally among all the brakes. This is accomplished by alternately applying only a selected number of brakes rather than all the brakes during each normal taxi braking operation.

Figure 1:
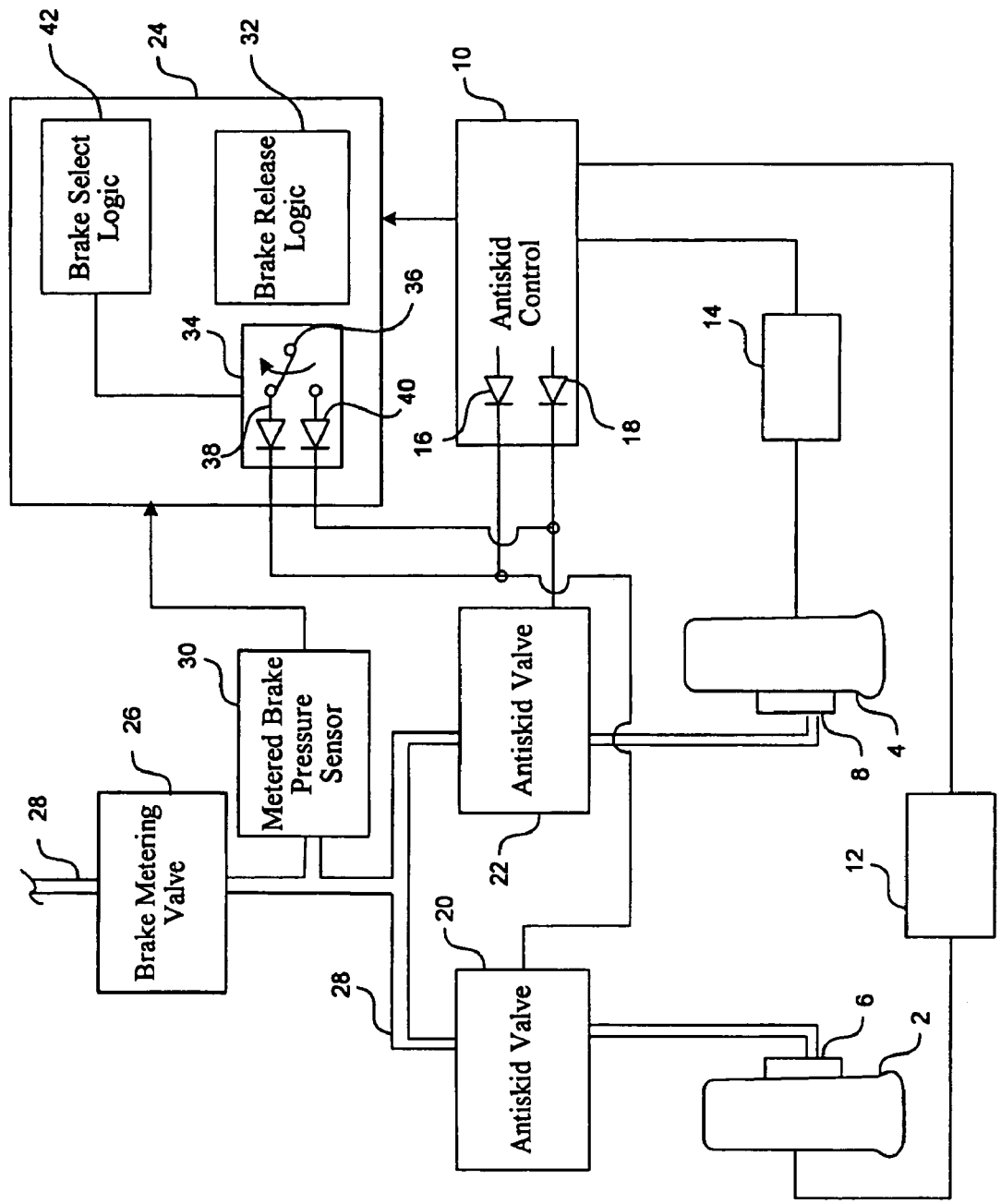
FIG. 1 is a simplified schematic of a subsystem for aircraft brakes which alternately disables one of two brakes in order to limit the number of brake applications and extend carbon brake life.

A simplified example of a preferred embodiment of this invention is shown schematically in FIG. 1. A left wheel 2 and right wheel 4 are on the same side of an airplane and are actuated by the one of the two brake pedals in the cockpit. Wheel 2 has a carbon brake 6 and right wheel 4 a carbon brake 8. In this embodiment, the antiskid control system 10 is integral to the brake disable system. Left and right wheel speed sensors 12 and 14, electronically measure wheel speeds and input the signals generated to the antiskid control circuit 10. Signals from antiskid control circuit 10 are outputted through diodes 16 and 18 to left and right hydraulic antiskid valves 20 and 22. The signals from wheel speed sensors 12 and 14 are integrated by antiskid control circuit 10 and outputted to brake disable control circuit 24.

Brake metering valve 26 which is responsive to a call for braking from the cockpit is located in brake hydraulic line 28. The static line pressure is low, pressure during taxi snubs is higher, and pressure during parking and emergency braking is relatively higher still. This pressure is measured at metered brake pressure sensor 30. The signal from sensor 30 is inputted to brake disable control circuit 24.

The system works in accordance with the invention as follows. The speeds of wheels 2 and 4 are sensed through sensors 12 and 14 and processed in antiskid control circuit 10 to determine aircraft speed. That aircraft speed signal is inputted to brake disable circuit 24. The desired intensity of braking action is sensed by the metered brake pressure sensor 30 and is also inputted to brake disable circuit 24. Inside brake disable control circuit 24, the metered pressure signal is compared against a first predetermined value, 100 psi for example, to detect when a brake application has been commanded. At the moment at which a brake application is detected, a comparison is made between the aircraft speed signal and a predetermined value for aircraft speed in brake release logic circuit 32. If the speed is higher than the predetermined value, 40 mph, for example, then brake disablement is not enabled. Subsequently, comparison is continuously made inside brake release logic 32 between the metered pressure signal value and a second predetermined value. If the pressure is greater than the second predetermined value, greater than 1500 psi, for example, then the brake disable control circuit 24 does not disable any brakes. That is, if heavy braking intensity is called for, all the brakes are applied. If and only if aircraft speed at the time of brake application and metered brake pressure are lower than their predetermined maximum values will brake release logic circuit 42 be activated.

As indicated by bipolar knife switch 36, only one of the two antiskid valves 20 and 22 will be commanded to release its respective brake through left diode 38 or right diode 40 when brake release logic 32 triggers. Brake select logic circuit 42 remembers which brake was last disabled and switches switch 36 when a new brake application has been detected by brake disable circuit 24.

Brake disable logic 24 responds to both the metered pressure signal and the aircraft speed signal at the time of brake application. Thereafter, logic circuit 24 responds only to the metered pressure signal from sensor 30 until the metered brake pressure returns to the no-braking system pressure. This ensures that following a high speed brake application, such as a landing, the brake release command will not be produced, and half the brakes will not be released, as the aircraft decelerates through the brake disable speed threshold. The disable signal would then only be produced at low speed after the brakes were released, then reapplied.

If an emergency stop, i.e., high metered pressure is sensed by brake disable circuit 24, then brake release logic 32 removes the brake release command so that both brakes 6 and 8 are applied, thus insuring full aircraft braking capability when it is needed. Similarly, if a higher speed stop, such as a landing stop or rejected take off, is sensed by brake disable circuit 24 from the aircraft speed signal, then the brake release logic 32 removes the brake release command so that both brakes 6 and 8 may share the braking energy, preventing overheating of an individual brake or brakes.

While the desired braking intensity has been described in terms of metered braking pressure, other input to the brake disable circuit providing like information would be equally useful. For example, the acceleration and throw of the brake pedal in the cockpit could be monitored or the rate of brake temperature increase. Similarly, input other than aircraft speed such as wheel speed or aircraft ground speed measured independently of the wheel speed could be inputted to the brake disable circuit. Such alternatives will be apparent to those skilled in the art.

Figure 2:
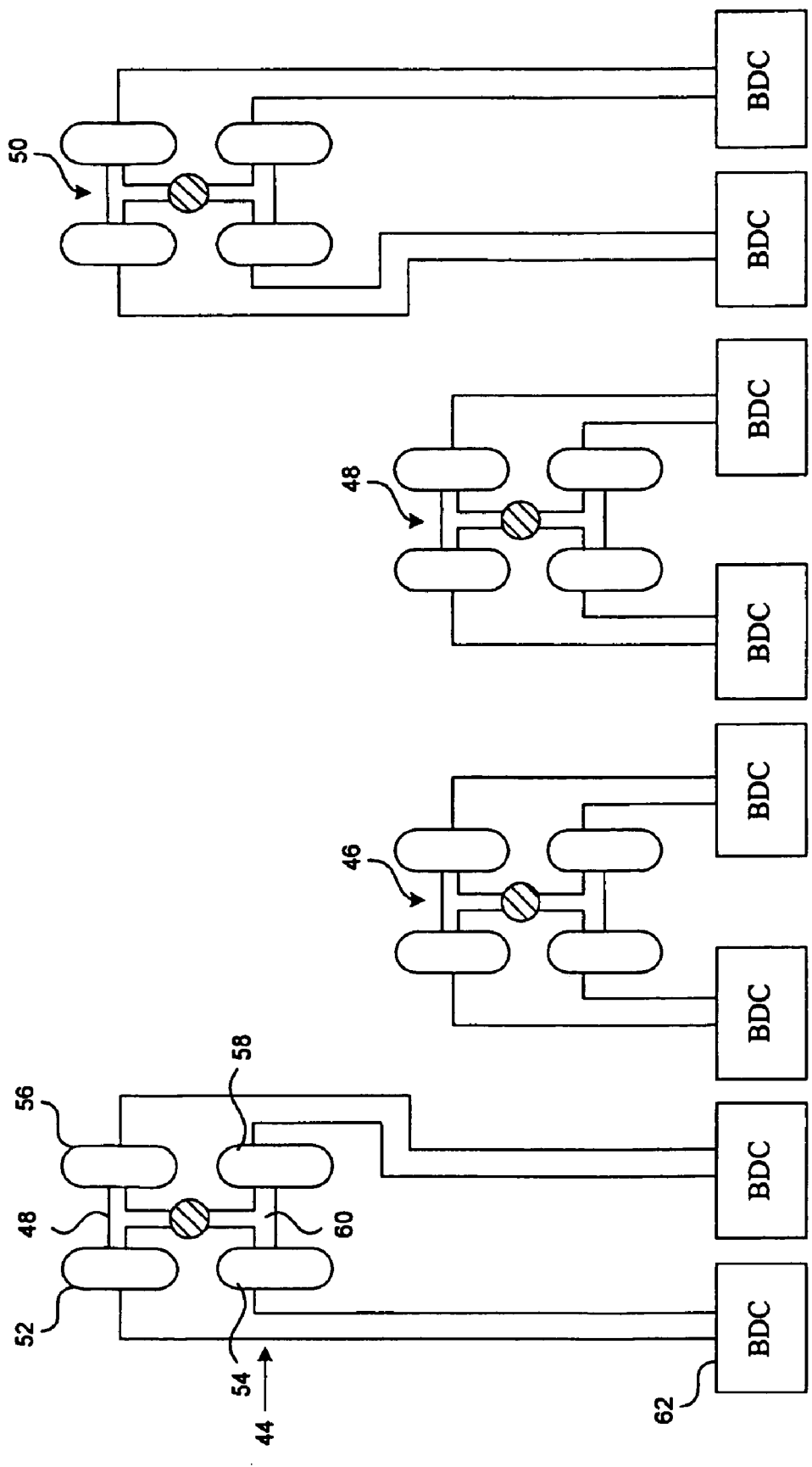
FIG. 2 is a schematic view of a sixteen wheel and brake landing gear configuration for a wide bodied aircraft showing a brake disable circuit which would be activated under low braking pressure and aircraft speed conditions representative of taxi braking to disable half the brakes and thereby extend brake life.

The invention has been described specifically in FIG. 1 in terms of a brake pair on one side of an aircraft. However, systems in accordance with this invention for aircraft with other numbers and arrangements of carbon braked wheels could be readily adapted by persons skilled in the art. For example, FIG. 2 shows the wheel configuration for a wide-bodied Boeing 747-400™ series aircraft equipped with a carbon brake on each main gear wheel. The nose wheel which is not braked is not shown.

Referring to FIG. 2, there are four four-wheel trucks located under the left wing 44, left body 46, right body 48 and right wing 50 of an aircraft. Using truck 44 as an example, wheels 52 and 54 on one side, and 56 and 58 on the other side of a four-wheel axle frame 60 each provide input to a brake disable circuit 62 like that described in FIG. 1. A metered brake pressure signal would also be provided to each like brake disable circuit. Thus, when both the aircraft speed at time of brake application and metered brake pressure are below target values, half of the sixteen brakes would be disabled. For example, brakes on wheels 52 and 54 on the left side of the truck 60 would be alternately disabled during successive brake applications as would the brakes on wheels 56 and 58.

Since Carbon brake wear is a function of the number of applications, and since the vast majority of brake applications occur during taxiing, the life of carbon brakes is significantly improved by practicing this invention. For example, if half the brakes are applied during each taxi brake application, brake wear life could nearly double. The life of carbon brakes might be proportionately extended even further by disabling even more than half the brakes during each braking cycle. System logic insures maximum braking capability during emergency braking, i.e., high pressure, conditions. Overheating of individual brakes is prevented because system logic alternates between brakes to share the braking energy among all the brakes.

Other system refinements such as redundant metered pressure sensors could be added to improve failure mode performance. Also, means could be provided to smooth brake pedal control responsiveness in the cockpit between partial brake and full brake transitions. That is, the back pressure on the brake pedal could be adjusted so that equal pedal depression results in equal braking responsiveness irrespective of how many brakes are being disabled at a given time. Brake temperature could also be considered in the brake disabling algorithm to prevent disablement if some brakes are too hot from previous brake applications.

While the invention has been described in terms of specific embodiments thereof, other forms may be readily adapted by one skilled in the art. Accordingly, the scope of the invention is to be limited only in accordance with the following claims.

The invention claimed is:

1. A method for controlling a vehicle braking system, comprising:

providing a first back force on a brake pedal when the brake pedal is depressed to a first pedal deflection point and when the braking system has a first braking effectiveness; and providing a second back force on the brake pedal when the brake pedal is subsequently depressed to a second pedal deflection point and when the braking system has a second braking effectiveness different than the first braking effectiveness, wherein the second pedal deflection point is at least approximately the same as the first pedal deflection point, and wherein the second back force is different than the first back force.

2. The method of claim 1 wherein providing the first back force includes providing the first back force as a function of pedal deflection in accordance with a first schedule, and wherein providing the second back force includes providing the second back force as a function of pedal deflection in accordance with a second schedule different than the first schedule.

3. The method of claim 1 wherein providing the first and second back forces on a brake pedal includes providing the first and second back forces on an aircraft brake pedal.

4. The method of claim 1 wherein providing the first back force when the braking system has a first effectiveness includes providing the first back force when the braking system has a first number of enabled brakes, and wherein providing the second back force when the braking system has a second effectiveness includes providing the second back force when the braking system has a second number of enabled brakes, the second number being different than the first number.

* * * * *